No. 773,226. PATENTED OCT. 25, 1904.
W. D. ROBINSON.
VETERINARY SPECULUM.
APPLICATION FILED APR. 25, 1904.
NO MODEL.

Witnesses

Inventor
W. D. Robinson,
By
R. A. B. Lacey, Attorneys

No. 773,226. Patented October 25, 1904.

UNITED STATES PATENT OFFICE.

WILLIAM D. ROBINSON, OF TRAVERSE CITY, MICHIGAN.

VETERINARY SPECULUM.

SPECIFICATION forming part of Letters Patent No. 773,226, dated October 25, 1904.

Application filed April 25, 1904. Serial No. 204,843. (No model.)

*To all whom it may concern:*

Be it known that I, WILLIAM D. ROBINSON, a citizen of the United States, residing at Traverse City, in the county of Grand Traverse and State of Michigan, have invented certain new and useful Improvements in Veterinary Speculums, of which the following is a specification.

This invention relates to improvements in mouth-speculums particularly designed for veterinary purposes to rigidly hold the mouth of an animal open while this member or adjacent parts are being operated upon or for purposes of administering medicine or the like.

The essential feature of the invention is to provide a device of the class above recited which is comparatively simple in its operation and structure and therefore possessed of advantages making it very desirable to those having need for an implement of the class to which my invention relates.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1:
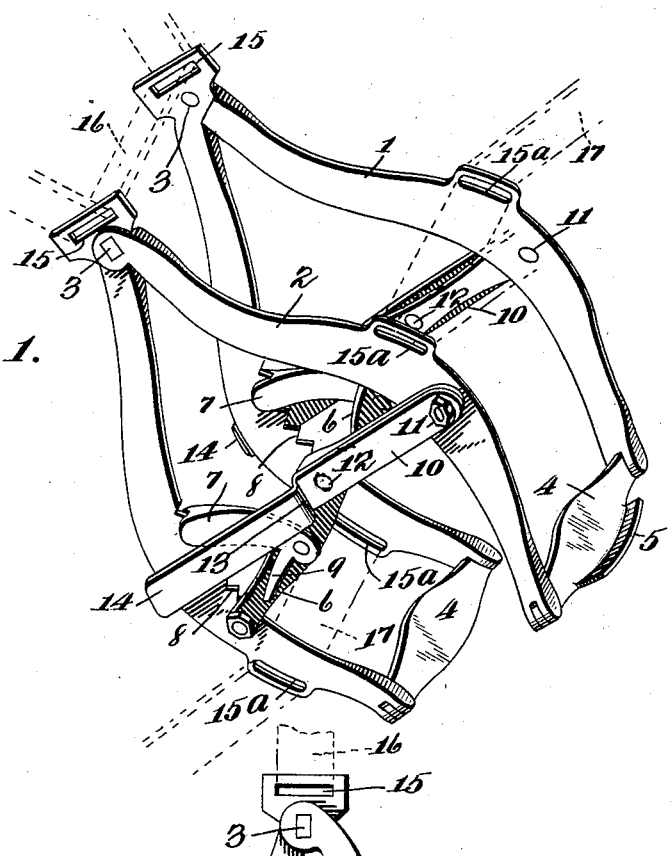
Figure 2:
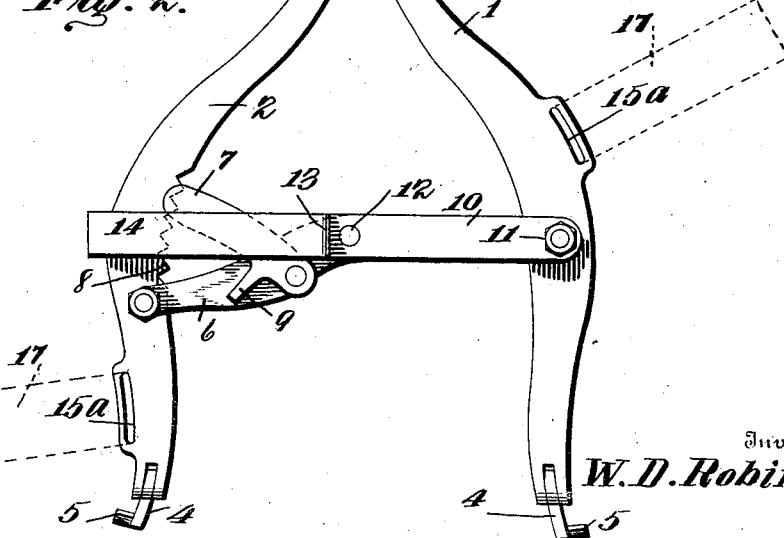

Figure 1 is a perspective view showing the embodiment of the invention. Fig. 2 is a side elevation.

Corresponding and like parts are referred to in the following description and indicated in both views of the drawings by the same reference characters.

In carrying out my invention the same comprises side frames of similar form, which frames are adapted to be secured to the sides of the head of the animal when the device is being used. Each of the side frames of the speculum is composed of upper and lower side bars 1 and 2, respectively, and these side bars are pivotally connected at one end, as shown at 3. The upper side bars 1 of each of the frames are connected at the end opposite to that which is pivotally secured at 3 by means of a bit member 4, and the corresponding lower side bars 2 of each of the frames is similarly connected by a bit member 4. The bit member 4 is adapted to engage within the mouth of the animal to bear against the teeth of the upper and lower jaws of the animal, and said bit members are each provided with teeth-engaging flanges 5, projected therefrom. The teeth-engaging flanges 5 may be integrally formed or otherwise, as found best in the manufacture of my invention, and the bit members 4 may be removably secured to the respective side bars 1 and 2 of the frames, if desired. The upper and lower bars 1 and 2, respectively, of each frame are connected at points between their ends by means of toggle-levers 6, and these levers 6 are adapted to be operated toward an alined position when it is necessary to distend the jaws of the animal by separating movement of the bit members 4 of the device. To lock the bit members in separated position after the jaws of the animal have been distended thereby, or, in other words, to lock the toggle members 6 in such a position as to fix the position of the said bit members 4, pivoted dogs 7 are utilized, said dogs being pivoted to the lowermost toggle-levers 6 of each of the frames. The dogs 7 are adapted to engage with teeth 8, formed upon the upper edge portions of the lower side bars 2 of each of the frames. In order to prevent likelihood of lateral displacement of the engaging ends of the dogs 7 from the toothed portions 8 of the bars 2, the lower ends or engaging ends of the said dogs 7 are bifurcated, so as to embrace the bars 2 upon opposite sides, and thus lateral play of the dogs 7 is prevented, and they are virtually guided in their movement along the bars 2 in the operation of the device. Finger-pieces 9 are projected from the dogs 7, so that the same may be quickly operated to disengage them or engage them with the bars 2 when the toggle-levers 6 are being actuated, so as to separate the jaws of the animal.

The means for operating the toggle-levers 6 consists of levers 10, said levers being pivoted at their upper ends to the upper side bars 1 of the frames by means of a pivot member 11. The pivot member 11 constitutes the pivotal support for the upper toggle-levers of each frame, as shown most clearly in Fig. 1. The actuating-lever 10 is also secured about intermediate its ends to the pivotal fastening 12, by which the toggle-levers 6 of each frame are connected. The actuating-levers are thus adapted to move the upper toggle-levers 6 of each frame, and said movement will cause an opening or spreading movement of the bit members 4 in a manner which will be readily seen. The levers 10 are outwardly deflected, as shown at 13, to form lower handle members 14, said handle members being spaced from the lowermost side bars 2 of the frames because of the deflected formation of the levers, as above described. The disposition of the handles 14 admits of obtaining a rigid hold thereof in the manipulation of the said levers 10 to operate the device. The finger-pieces 9 of the dogs 7 are disposed adjacent the handles 14 of the levers 10, and the location of the said finger-pieces 9 is obviously very convenient to the levers 10, so that the dogs 7 may be quickly disengaged when it is desired to remove the device from the head of the animal for use thereof. In order to secure the device to the animal's head, the lower levers 2 are provided at their pivoted ends with loops 15, which are connected by an adjusting-strap 16. The adjusting-strap 16 is designed to secure the upper portions of the frames of the device to the head of the animal. In order to more firmly hold the device in position, the upper bars 1 and lower bars 2 of each frame are provided with integral loops 15ª at points between the ends thereof, and these loops are connected by straps 17, adapted to embrace the upper and lower jaws of the animal to firmly hold the invention in place.

From the foregoing it will be noted that the device is readily susceptible of use upon animals having different-sized heads and that the degree of adjustment of the bit members may be varied to open the mouth of the animal to a greater or less extent. When it is desired to remove the device, if same has been used, the handles 14 of the actuating-levers 10 are grasped and by pulling said members toward the bit members 4 and at the same time pressing upon the finger-pieces 9 of the dogs 7 said dogs are disengaged and permit the bit members to move toward each other. The adjusting-straps 16 and 17 may then be loosened and the device removed.

Having thus described the invention, what is claimed as new is—

1. In a veterinary speculum, the combination of side frames each composed of upper and lower bars pivotally connected at one end, the opposite ends of the upper bars of each frame being connected by a bit member, toggle-levers connecting the upper and lower bars of each frame, means for actuating said toggle-levers to cause separation of the bit members, engaging dogs pivoted to certain of the toggle-levers to fix the position thereof, finger-pieces projected from the engaging dogs, the lower bars of each of the frames being provided with the engaging teeth coöperating with the engaging dogs aforesaid, said engaging dogs being bifurcated at their engaging ends so as to embrace the lower bars of each frame, and means for actuating the toggle-levers to effect separating movement of the bit members.

2. In a veterinary speculum, the combination of side frames each composed of upper and lower side bars pivotally connected at one end, bit members connecting the opposite ends of the corresponding upper and lower side bars of each frame, toggle-levers connecting the upper and lower side bars of each frame, means for fixing the positions of said toggle-levers, and actuating-levers pivoted to the upper bars of each frame at their upper ends and receiving at a point between their ends the pivotal connections of the toggle-levers of each frame to establish a pivotal connection with said levers, whereby movement of the actuating-levers causes actuation of the toggle-levers.

In testimony whereof I affix my signature in presence of two witnesses.

WILLIAM D. ROBINSON. [L. S.]

Witnesses:
 ELIZA ROBINSON,
 ELIZA BOYER.